Patented Feb. 1, 1927.

1,616,365

UNITED STATES PATENT OFFICE.

HANS HAHL, OF ELBERFELD, GERMANY, ASSIGNOR TO WINTHROP CHEMICAL COMPANY, INC., OF NEW YORK, N. Y.

PHARMACEUTICAL PRODUCT.

No Drawing. Application filed October 5, 1925,. Serial No. 60,672, and in Germany November 28, 1924.

I have found that new and therapeutically valuable antimony compounds can be obtained by treating the salts of hydroxyquinoline sulfonic acids e. g. with alkali or alkaline earth metals with antimony oxides e. g. the trioxide.

The new products are generally colored powders soluble in cold and hot water. By treatment with a solution of alkali metal sulfide, antimony sulfide is precipitated. They have proved to be valuable remedies for the treatment of spyrochaetoses. They are employed in solution for subcutaneous use.

In order to illustrate the new invention the following example is given, the parts being by weight:—

A neutral aqueous solution of the sodium salt of 8-hydroxyquinoline disulfonic acid (see Monatshefte für Chemie, Vol. X, 1889, page 801) is heated with an excess of $Sb(OH)_3$. After the reaction is complete it is filtered and the filtrate is poured into alcohol. A yellow powder is thus obtained. It is soluble in water and contains about 9% antimony.

The structure of the product obtained according to the process described in the above example may be represented by the following formula in which the antimony is linked to the oxygen atom of the hydroxyl group in the quinoline nucleus:

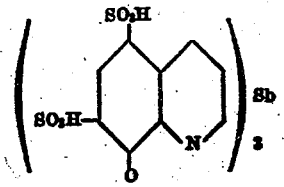

The product obtained from 8-hydroxyquinoline-5-sulfonic acid is a whitish-yellow powder.

I claim:

1. The process for producing antimony compounds of hydroxyquinoline sulfonic acids comprising the treatment of salts of hydroxyquinoline sulfonic acids with antimony oxid and isolating the resulting products, substantially as described.

2. The process for producing antimony compounds comprising the treatment of salts of hydroxyquinoline sulfonic acids with antimony hydroxide $(Sb(OH)_3)$ and isolating the resulting products, substantially as described.

3. The herein described new antimony compounds obtainable from salts of hydroxyquinoline sulfonic acids and antimony oxid, said compounds being generally colored products soluble in water and valuable remedies against spyrochaetoses, substantially as described.

4. The herein described new antimony compound obtainable from 8-hydroxyquinoline disulfonic acid salt and antimony hydroxide being a yellow powder soluble in water, containing about 9% antimony and being a valuable remedy against spyrochaetoses, substantially as described.

In testimony whereof I have hereunto set my hand.

HANS HAHL.